US008428460B2

(12) United States Patent
Lee et al.

(10) Patent No.: US 8,428,460 B2
(45) Date of Patent: Apr. 23, 2013

(54) WAVELENGTH DIVISION MULTIPLEXING PASSIVE OPTICAL NETWORK HAVING MULTIPLE BRANCHES OF OPTICAL DISTRIBUTION

(75) Inventors: Chang-Hee Lee, Taejon (KR); Hak Kyu Lee, Daejeon (KR); Dong-Sung Lim, Daejeon (KR)

(73) Assignee: LG-Nortel Co., Ltd., Seoul (KR)

( * ) Notice: Subject to any disclaimer, the term of this patent is extended or adjusted under 35 U.S.C. 154(b) by 858 days.

(21) Appl. No.: 10/593,848

(22) PCT Filed: Apr. 8, 2005

(86) PCT No.: PCT/US2005/011886
§ 371 (c)(1),
(2), (4) Date: Aug. 6, 2007

(87) PCT Pub. No.: WO2005/099148
PCT Pub. Date: Oct. 20, 2005

(65) Prior Publication Data
US 2008/0089687 A1  Apr. 17, 2008

(30) Foreign Application Priority Data

Apr. 9, 2004  (KR) .......................... 10-2004-0024465

(51) Int. Cl.
*H04J 14/02* (2006.01)
*H04J 14/00* (2006.01)
*G02B 6/293* (2006.01)
*G02B 6/28* (2006.01)
*H04Q 11/04* (2006.01)

(52) U.S. Cl.
USPC ................... 398/72; 398/69; 398/68; 398/66; 398/43; 398/79; 398/100

(58) Field of Classification Search .................... 398/72, 398/49, 71, 70, 68, 66
See application file for complete search history.

(56) References Cited

U.S. PATENT DOCUMENTS 5,680,490 A  *  10/1997  Cohen et al. ..................... 385/24
6,512,614 B1 *  1/2003  Saleh et al. ...................... 398/47
(Continued)

FOREIGN PATENT DOCUMENTS

EP       0 782 285 A      7/1997
EP       0 938 205 A      8/1999
(Continued)

OTHER PUBLICATIONS

Bass, M., Van Stryland, E., Williams, D., and Wolfe, W., "Optical Properties of Films and Coating," Chapter 42 of Handbook of Optics, vol. 1, McGraw-Hill New York, 1995.

(Continued)

*Primary Examiner* — Shi K Li
*Assistant Examiner* — Oommen Jacob
(74) *Attorney, Agent, or Firm* — Blakely, Sokoloff, Taylor & Zafman LLP (57) ABSTRACT

Various methods and apparatuses are described for a wavelength division multiplexing passive optical network (WDM-PON) that performs bi-directional communication. The WDM-PON may include two or more remote distribution nodes in between a central office and the most distant optical network unit. Each remote distribution node is located in a physically separate location. A first remote distribution node has two or more optical network units connected to the first remote distribution node. Each remote node separates one or more wavelength channels from a composite optical signal distributed through that remote distribution node.

11 Claims, 5 Drawing Sheets

U.S. PATENT DOCUMENTS

| | | | |
|---|---|---|---|
| 6,546,166 B1 * | 4/2003 | Liu et al. | 385/24 |
| 7,016,608 B1 * | 3/2006 | Ball et al. | 398/71 |
| 7,310,481 B2 * | 12/2007 | Park et al. | 398/72 |
| 2001/0038479 A1 * | 11/2001 | Liu et al. | 359/127 |
| 2004/0033076 A1 * | 2/2004 | Song et al. | 398/70 |
| 2004/0264963 A1 * | 12/2004 | Kani et al. | 398/72 |

FOREIGN PATENT DOCUMENTS

| | | |
|---|---|---|
| EP | 1 388 963 A | 2/2004 |
| WO | WO 03055111 A1 * | 7/2003 |

OTHER PUBLICATIONS

Fitel "Athermal AWG Module" Data Sheet PS701, Jan. 2003.
Fibernett "100GHz 8 Skip 2 Filter" as downloaded on Jun. 14, 2007.
Fibernett "C/L Band Separator" as downloaded on Jun. 14, 2007.
Fibernett "C-Band Red/Blue Separator" as downloaded on Jun. 14, 2007.
Fibernett "100GHZ 4 Skip 1 Filter" as downloaded on Jun. 14, 2007.
JDS Uniphase "100 GHz, Narrowband (Gaussian) Arrayed Waveguide Grating (AWG)" as downloaded on Jun. 14, 2007, p. 1-3, www.jdsu.com.
JDS Uniphase "Multi-Channel Mux/Demux Module 100 GHz Spacing" as downloaded on Jun. 14, 2007, p. 1-4, www.jdsu.com.
JDS Uniphase "IBC Interleaver: 50/100GHz, 100/200 GHz Passive Interleavers" as downloaded on Jun. 14, 2007, p. 1-4, www.jdsu.com.
JDS Uniphase "WDM, Filter, 100 GHz, ITU Component: DWS Series" as downloaded on Jun. 14, 2007, p. 1-2, www.jdsu.com.
JDS Uniphase "1536/1554 nm 3-Port Bandpass Wavelength Division Multiplexers" as downloaded on Jun. 14, 2007, p. 1-2, www.jdsu.com.
PCT Notification of International Search Report and the Written Opinion of the International Searching Authority, or the Declaration for PCT/US2005/011886, mailed Aug. 4, 2005, 12 pages.
Takahashi, Hiroshi et al., "Transmission Characteristic of Arrayed-Waveguide NxN Wavelength Multiplexer," Journal of Lightwave Technology, vol. 13, p. 447-455, Mar. 1995.

* cited by examiner

WAVELENGTH DIVISION MULTIPLEXING PASSIVE OPTICAL NETWORK HAVING MULTIPLE BRANCHES OF OPTICAL DISTRIBUTION

This application is a National Phase application of International Application No. PCT/US2005/011886, filed Apr. 8, 2005, which claims priority from South Korean patent application number 2004-24465, filed Apr. 9, 2004, entitled WAVELENGTH DIVISION MULTIPLEXING PASSIVE OPTICAL NETWORK HAVING MULTIPLE BRANCHES OF OPTICAL DISTRIBUTION, which is hereby incorporated by reference. The present application claims priority to both International Application No. PCT/US2005/011886, filed Apr. 8, 2005, and South Korean Patent Application Ser. No. 2004-24465, filed Apr. 9, 2004.

FIELD

Embodiments of the invention relate generally to a passive optical network (PON), and more particularly, to a wavelength division multiplexing passive optical network (WDM-PON) having multiple branches of optical distribution.

BACKGROUND

Figure 1:
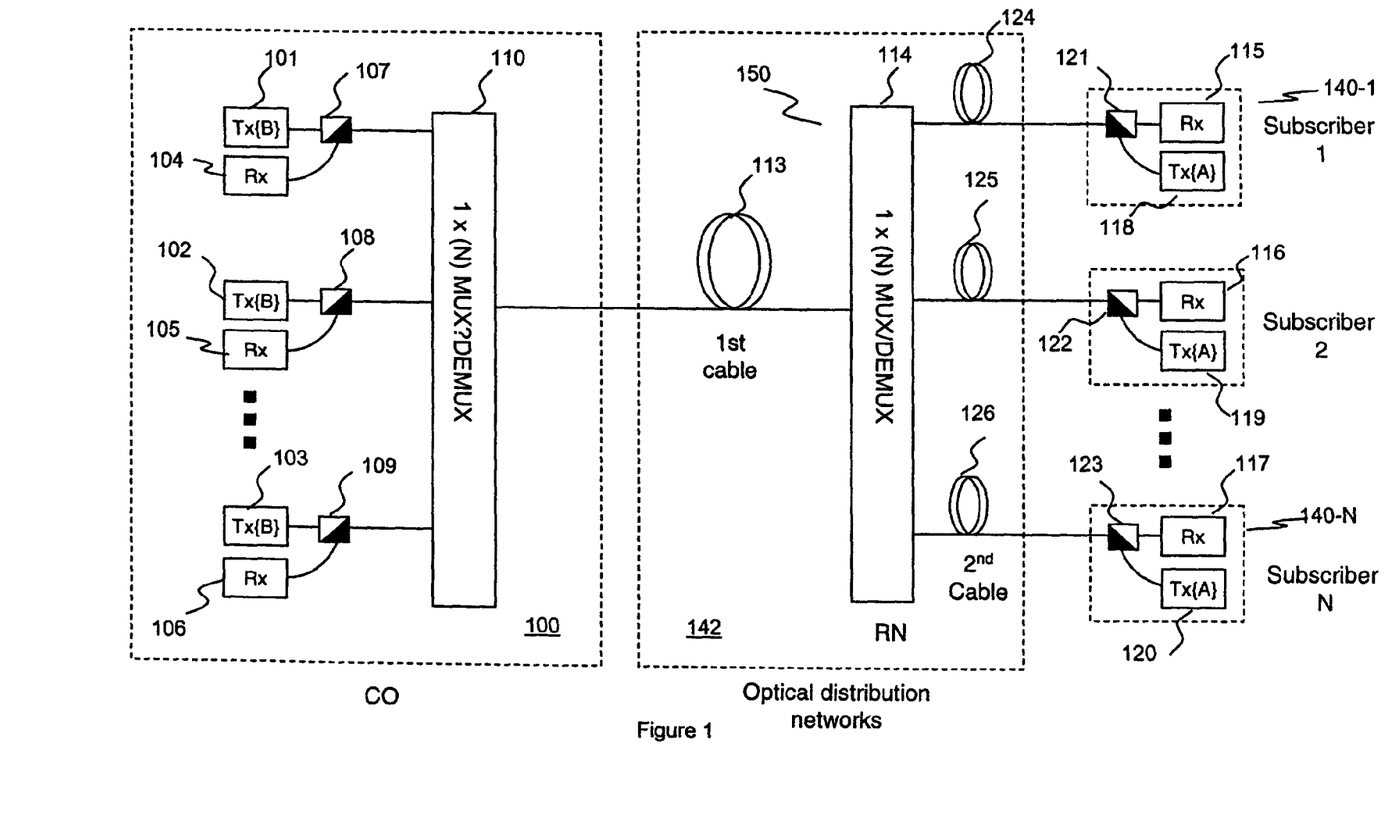
FIG. 1 is a block diagram showing a structure of a conventional WDM-PON.

FIG. 1 is a block diagram illustrating the structure of a conventional WDM-PON. Referring to FIG. 1, the conventional WDM-PON includes a central office 100, an optical distribution network 142 and optical network units 140-1, 140-2, ..., and 140-N (hereinafter, commonly designated as 140).

The conventional WDM-PON performs bi-directional communication by using two different wavelength bands. For instance, a downstream signal is transmitted from the central office 100 to the optical network unit 140 through an A wavelength band, such as 1570-1620 nanometers. An upstream signal is transmitted from the optical network unit 140 to the central office 100 through a B wavelength band, such as 1450-1500 nanometers.

The central office 100 includes a plurality of optical transmitters 101, 102 and 103 for transmitting downstream signals having an A wavelength band, a plurality of optical receivers 104, 105 and 106 for receiving upstream signals having a B wavelength band, a plurality of band division filters 107, 108 and 109 for coupling/decoupling light having an A wavelength band to/from light having a B wavelength band, and a 1×N multiplexer/demultiplexer 110, wherein N represents the number of optical network units.

The optical unit network 140 includes a plurality of optical transmitters 118, 119 and 120 for transmitting upstream signals having a B wavelength band, a plurality of optical receivers 115, 116 and 117 for receiving downstream signals having an A wavelength band, and a plurality of band division filters 121, 122 and 123 for coupling/decoupling light having an A wavelength band to/from light having a B wavelength band.

The optical distribution network 142 is located between the central office 100 and the optical network units 140-1 to 140-N and includes a first-branch optical cable 113 for transmitting optical signals having multiplexed wavelengths from the central office 100 to a remote node 150, a 1×N multiplexer/demultiplexer 114 for multiplexing/demultiplexing optical signals transmitted thereto from the central office 100 and the optical network units 140, and N second-branch optical cables 124, 125 and 126 for connecting the 1×N multiplexer/demultiplexer 114 to the optical network units 140. In this regard, the 1×N multiplexer/demultiplexer 114 has a role of a remote node.

Since the optical distribution network 142 of the conventional WDM-PON has a double-branch structure including the first-branch optical cable 113, the second-branch optical cable 124-126 and the remote node 150, if the number of optical network units for the WDM-PON is N, all of the N optical network units 140 are connected to one remote node 150. Thus, the remote node 150 is located at a center of the N optical network units in order to minimize an amount of optical cables (i.e., optical fibers) to be used. However, if it is difficult to install the remote node 150 at the center of the N optical network units 140 due to geographic or local characteristics, the remote node 150 may be connected to the optical network units 140 through an inefficient structure, resulting in waste of expensive optical fibers. In particular, if the conventional WDM-PON having the two branches of optical distribution is applied to agricultural villages in which the optical network units 140 are sporadically distributed over the whole area of agricultural villages, optical fibers are unnecessarily wasted and installation work thereof is difficult.

SUMMARY

Various methods and apparatuses are described for a wavelength division multiplexing passive optical network (WDM-PON) that performs bi-directional communication. The WDM-PON may include two or more remote distribution nodes in between a central office and the most distant optical network unit. Each remote distribution node is located in a physically separate location. A first remote distribution node has two or more optical network units connected to the first remote distribution node. Each remote node separates one or more wavelength channels from a composite optical signal distributed through that remote distribution node.

Other features and advantages of the present invention will be apparent from the accompanying drawings and from the detailed description that follows below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain some principles of the invention. In the drawings.

DETAILED DESCRIPTION

In general, a composite optical signal that includes all of the wavelength channels in a first wavelength band is separated in a transmission path between a central office and the most distant optical network unit into two or more smaller groups consisting of subsets of the wavelength channels. The composite optical signal is sequentially separated along the transmission path two or more times to generate the two or more smaller groups consisting of subsets of the wavelength channels. The WDM-PON may have multiple branches of optical distribution to overcome the structural problem of a double-branch optical distribution network. The WDM-PON may have multiple branches of optical distribution that can be easily installed while saving an amount of optical fibers to be used. The WDM-PON performs bi-directional communication.

Several example configurations of WDM-PONs will be described.

The WDM-PON may include a central office; a plurality of optical network units; and an optical distribution network physically connecting the central office to the optical network units and including at least two remote nodes that are physically separated from each other, and multiple branches of optical cable for sequentially connecting the central office, the remote nodes and the optical network units with each other.

The optical distribution network may include a first remote node, a second remote node located between the first remote node and the optical network units, and is provided with at least two multiplexers/demultiplexers, a first-branch optical cable for connecting the central office to the first remote node, a second-branch optical cable for connecting the first node to each of the multiplexers/demultiplexers of the second node, and a third-branch optical cable for connecting the multiplexers/demultiplexers to the optical network units, respectively.

The first remote node transmits downstream signals of the central office to the multiplexers/demultiplexers of the second node by dividing the downstream signals into several signal groups, and transmits upstream signals of the multiplexers/demultiplexers of the second node to the central office by coupling the upstream signals with each other.

The multiplexers/demultiplexers may include 1×N/2 multiplexers/demultiplexers, in which N is a number of optical network units.

The first remote node may include a division/coupling filter for dividing/coupling the upstream and downstream signals, a downstream signal division filter for dividing a downstream signal inputted thereto from the division/coupling filter into two or more subsets of wavelength channels in the downstream signal in order to output the subsets of wavelength channels to a predetermined multiplexer/demultiplexer. An upstream signal-coupling filter may receive subsets of wavelength channels in a different wavelength band from the multiplexers/demultiplexers in order to output the upstream signal to the division/coupling filter by combing the subsets of wavelength channels.

Alternatively, the first remote node may include an optical interleaver receiving the downstream signal from the central office. The optical interleaver divides the downstream signal into odd wavelength channel signals and even wavelength channel signals in order to output the odd and even wavelength signals to a predetermined multiplexer/demultiplexer. The optical interleaver may receive the odd and even wavelength channel signals from the predetermined multiplexer/demultiplexer in order to couple the odd wavelength signals with the even wavelength signals and to transmit the coupled signals to the central office.

Alternatively, the optical distribution network may include at least one remote node connected to the multiple optical cables and having one or more drop filters for dropping a wavelength channel from a downstream signal, which is allocated to a predetermined optical network unit, into the predetermined optical network unit. The network may further include one or more add filters for adding an upstream signal, which is transmitted from the predetermined optical network unit, to the multiple optical cables. The WDM-PON further comprises a multiplexer/demultiplexer located between a final remote node and remaining optical network units in order to multiplex/demultiplex upstream and downstream signals.

Figure 2:
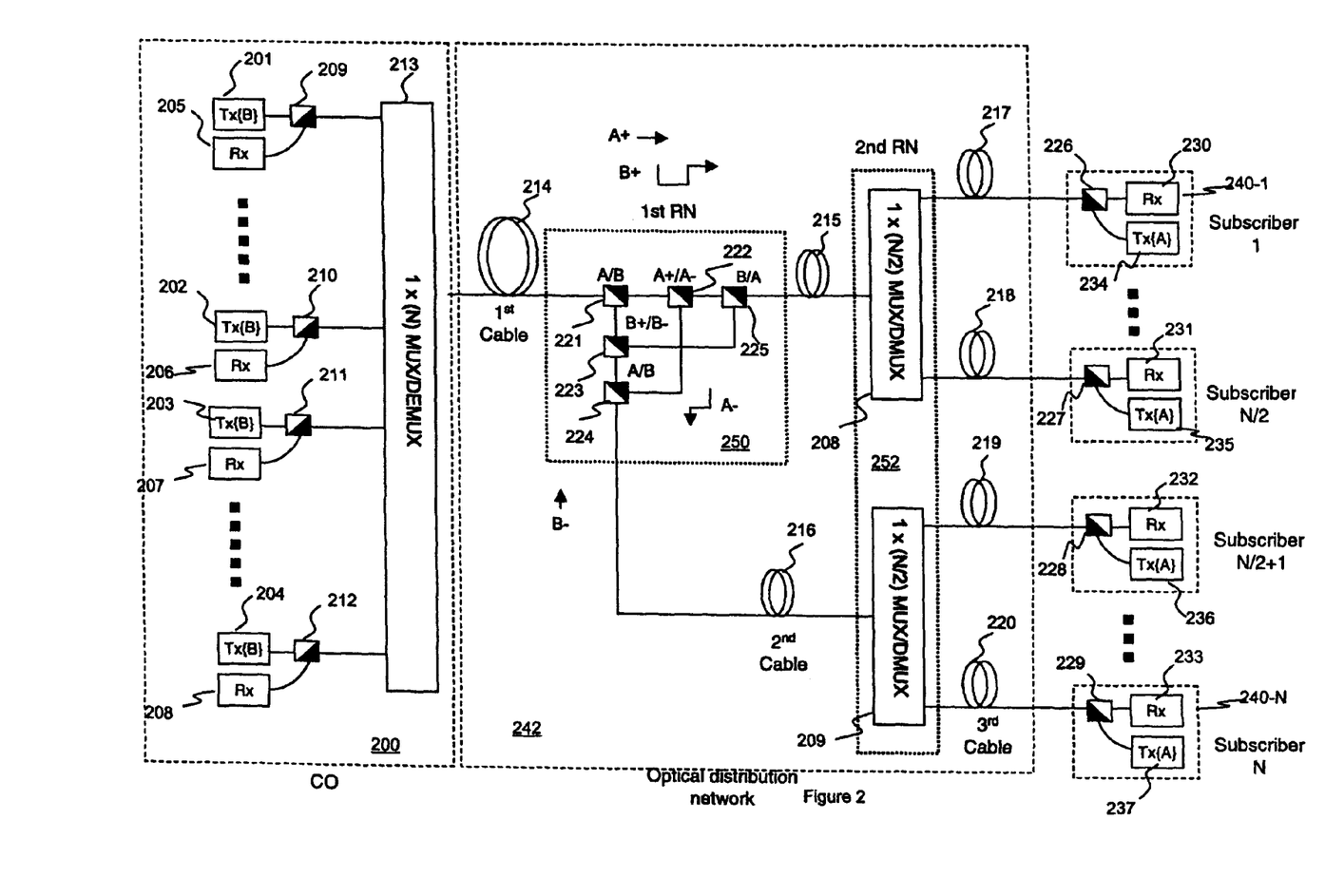
FIG. 2 is a block diagram of a structure of a WDM-PON having a 1×2×N/2 type division of wavelength channels with three-branches of optical distribution.

FIG. 2 is a block diagram of a structure of a WDM-PON having a 1×2×N/2 type division of wavelength channels with three branches of optical distribution.

Referring to FIG. 2, the WDM-PON includes a central office 200, an optical distribution network 242 and optical network units 240. The optical distribution network 242 physically connects the central office 200 to the optical network units 240 and includes two remote nodes and a triple-branch optical cable unit having first to third-branch optical cables connected to the remote nodes. Structures of the central office 200 and the optical network units 240 are similar to the structures of the central office and the optical network units shown in FIG. 1, so they will not be further described below in order to avoid redundancy.

In the three branches of optical distribution 242, a downstream signal transmitted from the central office 200, i.e., an optical signal having an A wavelength band, is transmitted to a first remote node 250 through a first-branch optical cable 214. Subsequently, the optical signal is split into a first subset of wavelength channels A+ and a second subset of wavelength channels A−, which are transmitted to first and second multiplexers/demultiplexers 208 and 209 of a second remote node 252 through two second-branch optical cables 215 and 216. Subsequently, the first and second multiplexers/demultiplexers 208 209 transmit optical signals having wavelengths that have been allocated for each subscriber to each optical network unit 240 by using N/2 third-branch optical cables 217 to 220.

In addition, an upstream signal transmitted from each optical network unit 240, i.e., an optical signal having a B wavelength band, is transmitted to the central office 200 through the second remote node 252 and the first remote node 250.

The first remote node 250 includes three A/B band division filters, i.e., first to third A/B band division filters 221, 224 and 225 for dividing a downstream optical signal having an A wavelength band and an upstream optical signal having a B wavelength band, an A+/A− band division filter 222 located among the first to third A/B band division filters 221, 224 and 225 in order to divide the downstream optical signal having the A wavelength band into a first subset of wavelength channels (A+ signal), such as wavelength channels 1-16, and a second subset of wavelength channels (A− signal), such as wavelength channels 17-32. The B+/B− band coupling filter 223 may be located among the first to third A/B band division filters 221, 224 and 225. The +/B− band coupling filter 223 couples a third subset of wavelength channels (B+ signal) inputted from the first multiplexer/demultiplexer 208 with a fourth subset of wavelength channels (B− signal) inputted from the second multiplexer/demultiplexer 209.

Thus, the first remote node 250 has a series of band splitting filters 221, 224 and 225 configured to split a first composite optical signal that includes all of the wavelength channels in a first wavelength band (i.e. downstream signal—"A") into a first subset of the wavelength channels (A+) and a second subset of the wavelength channels (A−).

The above division and coupling filters include thin film optical filters having a plurality of thin films, which are generally known in the art. Properties of the optical filters are disclosed in detail in Chapter 42 (Optical properties of films and coating) of "Handbook of Optics Volume 1" Bass, M., Van Stryland, E., Williams, D., and Wolfe, W. (eds), published by McGraw-Hill, New York, (1995).

The downstream signal transmitted from the central office 200, i.e., the optical signal having the A wavelength band, is transmitted to the A+/A− band division filter 222 through the first A/B band division filter 221 and is divided into the first subset of wavelength channels (A+ signal) and the second subset of wavelength channels (A− signal). Subsequently, the first subset of wavelength channels (A+ signal) is transmitted to the second A/B band division filter 225, and then transmitted to the first multiplexer/demultiplexer 208 of the second remote node 252 through the second-branch optical cable 215. In addition, the second subset of wavelength channels (A− signal) is transmitted to the third A/B band division filter 224, and then transmitted to the second multiplexer/demultiplexer 209 of the second remote node 252 through the second-branch optical cable 216. Thus, the downstream optical signals inputted from the central office 200 are divided into two groups based on wavelengths thereof and transmitted to the first and second multiplexers/demultiplexers 208 and 209. In addition, the first subset of wavelength channels (A+ signal) passing through the first multiplexer/demultiplexer 208 is divided into signals having various individual wavelengths and transmitted to first to $(N/2)^{th}$ optical network units 240-1 to 240-N/2. The second subset of wavelength channels (A− signal) passing through the second multiplexer/demultiplexer 209 is divided into signals having various individual wavelengths and transmitted to $(N/2+1)^{th}$ to $N^{th}$ optical network units 240-N/2+1 to 240-N.

In the meantime, the upstream signal inputted from each optical network unit 240, i.e., the optical signal having the B wavelength band, is transmitted in an opposite direction to the above manner. That is, the first multiplexer/demultiplexer 208 multiplexes a third subset of wavelength channels (B+ signals) inputted thereto from the first to $(N/2)^{th}$ optical network units 240-1 to 240-N/2 and transmits the multiplexed signals to the first remote node 250 through the second-branch optical cable 215. In addition, the second multiplexer/demultiplexer 209 multiplexes a fourth subset of wavelength channels (B− signals) inputted thereto from the $(N/2+1)^{th}$ to $N^{th}$ optical network units 240-N/2+1 to 240-N and transmits the multiplexed signals to the first remote node 250 through the second-branch optical cable 216. After that, the third subset of wavelength channels (B+ signals) inputted from the first multiplexer/demultiplexer 208 are transmitted to the B+/B− band coupling filter 223 through the second A/B band division filter 225 and the fourth subset of wavelength channels (B− signals) inputted from the second multiplexer/demultiplexer 209 are transmitted to the B+/B− band coupling filter 223 through the third A/B band division filter 224. Thereafter, the third subset of wavelength channels (B+ signals) are coupled with the fourth subset of wavelength channels (B− signals) at the B+/B− band division filter 222 and transmitted to the central office 200 through the first A/B band division filter 221.

Thus, the series of band splitting filters 221-225 are also coupled together to create a second composite optical signal that includes all of the wavelength channels in a second wavelength band (i.e. upstream signal (B) by combining a first portion of the wavelength channels (B+) in the second B wavelength band and a second portion of the wavelength channels (B−) in the second B wavelength band. The second composite optical signal travels in the opposite direction of the first composite optical signal and occupies a different wavelength band than the first composite optical signal.

The second remote node 252 contains a first multiplexer/demultiplexer 208 to receive a first subset of the wavelength channels (A+) in a first composite optical signal (A) from the first remote node 250 and to send the first portion of wavelength channels (B+) in a second composite optical signal B to the first remote node. The second remote node 252 also contains a second multiplexer/demultiplexer 209 to receive a second subset of the wavelength channels (A−) in the first composite optical signal (A) from the first remote node 250 and to send the second portion (B−) of the second B wavelength band to the first remote node 252. As discussed, the first multiplexer/demultiplexer 208 and second multiplexer/demultiplexer 209 may be located in separate physical localities as well as the remote nodes 250, 252 may be located in separate physical localities.

Herein, the first and second multiplexers/demultiplexers 208 and 209 of the second remote node can be installed in various positions while being physically separated from each other. Thus, the remote node can be located in an effective position by taking distribution of the optical network units into consideration.

In addition, the first and second multiplexers/demultiplexers 208 and 209 can be embodied in the form of arrayed waveguide grating (AWG). The AWG is generally known in the art. In particular, the AWG is disclosed in detail in the document "Transmission characteristic of arrayed-waveguide N×N wavelength multiplexer" (Journal of Lightwave Technology, volume 13, pages 447 to 455, March 1995).

Preferably, the first and second multiplexers/demultiplexers 208 and 209 can be embodied by means of a filter-type dense wavelength-division multiplexing multiplexer/demultiplexer.

Figure 3:
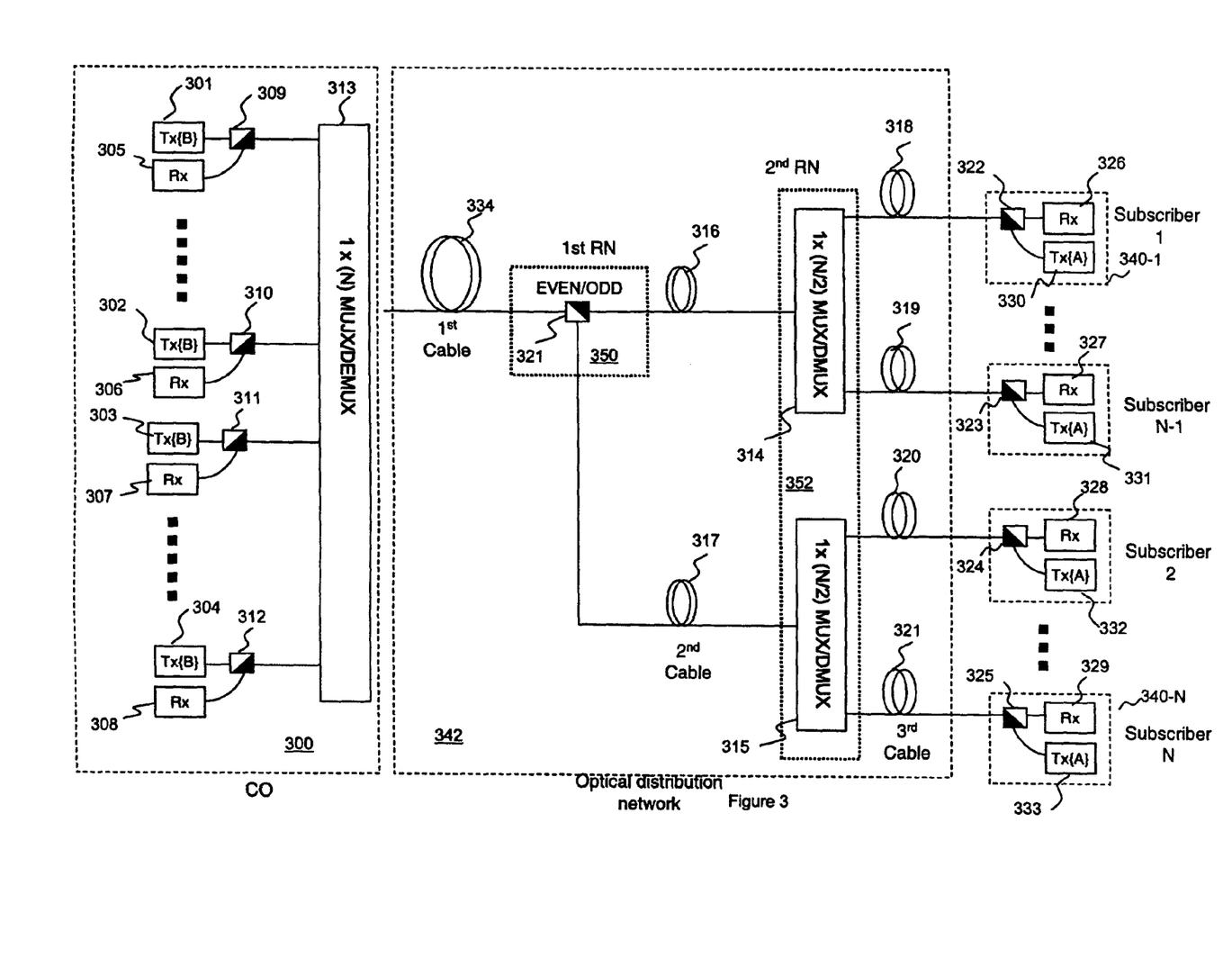
FIG. 3 is a block diagram of a structure of a WDM-PON having a 1×2×N/2 type division of wavelength channels with three-branches of optical distribution.

FIG. 3 is a block diagram of a structure of a WDM-PON having a 1×2×N/2 type division of wavelength channels with three branches of optical distribution.

Referring to FIG. 3, the WDM-PON includes a central office 300, an optical distribution network 342 and optical network units 340. The optical distribution network 342 physically connects the central office 300 to the optical network units 340 and includes first and second remote nodes 350 and 352 and a triple-branch optical cable unit having first to third-branch optical cables connected to the remote nodes 350 and 352. Herein, structures of elements similar to those shown in FIG. 1 will not be further described below in order to avoid redundancy.

The first remote node 350 includes an optical interleaver 321 for dividing a downstream signal inputted thereto from a first-branch optical cable 334 into odd optical wavelength signals and even optical wavelength signals. Thus, the first remote node 350 has an optical interleaver 321 configured to split a first composite optical signal in a first wavelength band (i.e. downstream signal—"A") into a first portion (A+) consisting of odd numbered wavelength channels and a second portion (A−) consisting of odd numbered wavelength channels. As generally known in the art, the optical interleaver 321 is an optical device for outputting optical signals by dividing the optical signals according to wavelengths or frequencies thereof.

A basic principle of the optical interleaver 321 is similar to a principle of a Mach Zhender optical interferometer, in which inputted optical signals are divided while passing through a 2×2 optical coupler having two inputs and two outputs and coupled with each other in the 2×2 optical coupler after traveling along two different optical paths, so that signals having uniform frequency intervals are separately outputted through two output ports. For instance, if N optical signals are inputted into the optical interleaver 321 with an interval of 100 GHz, optical signals of a +100 GHz, a +300 GHz . . . are outputted through a first output port 316a and optical signals of a +200 GHz, a +400 GHz . . . are outputted through a second output port 317b. In this regard, "a" is a predetermined band frequency of an optical signal. Thus, the N optical signals inputted with an interval of 100 GHz are divided into two signal groups with an interval of 200 GHz and N/2 optical signals are outputted through two output ports 316a and 317b, respectively. At this time, the optical signals outputted from the first output port 316a are defined as odd optical wavelength channel signals and the optical signals outputted from the second output port 317b are defined as even optical wavelength channel signals.

Accordingly, the optical signals inputted through the first-branch optical cable 334 are divided into odd optical wavelength channels and even optical wavelength channels at the optical interleaver 321 of the first remote node 350. Subsequently, the odd optical wavelength channels are outputted through the first output port 316a and transmitted to a first multiplexer/demultiplexer 314 through the second-branch optical cable 316, and the even optical wavelength channels are outputted through the second output port 317b and transmitted to the second multiplexer/demultiplexer 315 through the second-branch optical cable 317.

In addition, the first and second multiplexers/demultiplexers 314 and 315 divide the subsets of odd and even optical wavelength channels into signals having various wavelengths and transmit them to each optical network unit.

For the present embodiment, odd optical network units are connected to the first multiplexer/demultiplexer 314 and even optical network units are connected to the second multiplexer/demultiplexer 315 for illustration purposes.

Although the above description has been made in relation to the downstream signal transmitted to the optical network unit 340 from the central office 300, it is noted that the upstream signal is transmitted to the central office 300 from the optical network units 340 through a predetermined transmission procedure in an order reverse to that of the transmission procedure of the downstream signal. Thus, the second remote node 352 contains a first multiplexer/demultiplexer 314 that receives the odd numbered wavelength channels from the first remote node 350 and sends the first portion (B+) of the wavelength channels in the second wavelength band (B) to the first remote node 350. The second remote node 352 also contains a second multiplexer/demultiplexer 315 that receives the second even wavelength portion (A−) of the first A wavelength band from the first remote node 350 and sends the second even wavelength portion (B−) of the second B wavelength band to the first remote node 350. The optical interleaver 312 is also configured to create a second composite optical signal in a second wavelength band (i.e. upstream signal–"B") from a combination of a first portion of wavelength channels (B+) in the second wavelength band (B) and a second portion of wavelength channels (B−) in the second wavelength band (B). Herein, the upstream signals outputted from the first multiplexer/demultiplexer 314 are coupled with the downstream signals outputted from the second multiplexer/demultiplexer 315 at the optical interleaver 321 of the first remote node and then transmitted to the central office 300.

Figure 4:
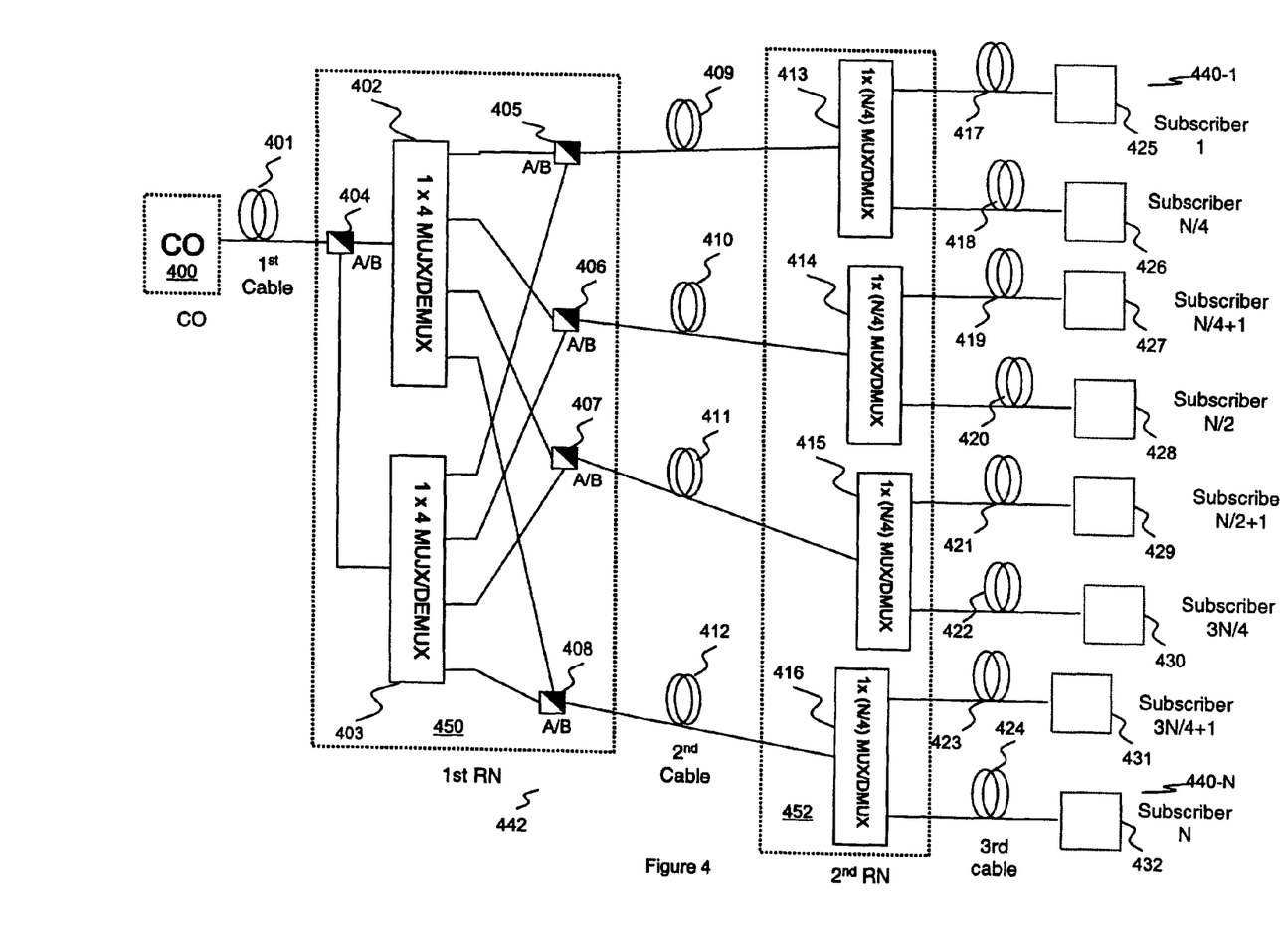
FIG. 4 is a block diagram of a structure of a WDM-PON having a 1×4×N/4 type division of wavelength channels with three-branches of optical distribution.

FIG. 4 is a block diagram of a structure of a WDM-PON having a 1×4×N/4 type division of wavelength channels with three-branches of optical distribution.

Referring to FIG. 4, the WDM-PON includes a central office 400, an optical distribution network 442 and optical network units 440. The optical distribution network 442 physically connects the central office 400 to the optical network units 440 and includes first and second remote nodes 450 and 452 and a triple-branch optical cable unit having first to third-branch optical cables connected to the remote nodes 450 and 452.

The first remote node 450 includes first to fifth optical filters 404, 405, 406, 407 and 408 for coupling/decoupling the downstream signal having an A wavelength band to/from the upstream signal having a B wavelength band, a demultiplexer 402 for dividing the downstream signal having the A wavelength band into four subsets of wavelength channels, and a multiplexer 403 for coupling four subsets of wavelength channels having the B wavelength band and transmitting them to the central office 400.

The downstream signal of the central office 400, i.e., the multiplexed optical signal having the A wavelength band is transmitted to a first optical filter 404 through a first-branch optical cable 401, and then transmitted to the demultiplexer 402. Upon receiving the multiplexed optical signal, the demultiplexer 402 divides the multiplexed optical signal having the A wavelength band into four subsets of wavelength channels and transmits them into the second to fifth optical filters 405, 406, 407 and 408.

For instance, if the number of optical network units are 32 (N=32) and 32 channels with a predetermined frequency internal are inputted into the demultiplexer 402 corresponding to the number of optical network units, optical signals of a +100 GHz, a +200 GHz, . . . a +700 GHz and a +800 GHz are outputted through the second optical filter 405, optical signals of a +1100 GHz, a +1200 GHz, . . . a +1700 GHz and a +1800 GHz are outputted through the third optical filter 406, optical signals of a +2100 GHz, a +2200 GHz, . . . a +2700 GHz and a +2800 GHz are outputted through the fourth optical filter 407, and optical signals of a +3100 GHz, a +3200 GHz, . . . a +3700 GHz and a +3800 GHz are outputted through the fifth optical filter 408. In this regard, "a" is a predetermined band frequency of an optical signal. Further, the optical signal having the A wavelength band can be divided into four subsets of wavelength channels; however, the present invention is not limited to the above manner.

Subsequently, the optical signal that has been transmitted to the second optical filter 405 is transmitted to a first multiplexer/demultiplexer 413 of the second remote node 452 through a second-branch optical cable 409. In the same manner, the optical signals that have been transmitted to the third through fifth optical filters 406, 407 and 408 are transmitted to the second through fourth multiplexers/demultiplexers 414, 415, and 416 via second-branch optical cables 410, 411, 412, respectively. Thus, the downstream optical signals of the central office 400 are divided into four subsets of wavelength channels and distributed into four multiplexers/demultiplexers. In addition, the optical signal inputted into the first multiplexer/demultiplexer 413 through the second-branch optical cable 409 is divided into signals having various wavelengths by means of the first multiplexer/demultiplexer 413 and is transmitted into a first group of optical network units 440-1 to 440-N/4 through N/4 third-branch optical cables 417 and 418. In the same manner, the optical signals inputted into the second to fourth multiplexers/demultiplexers 414 to 416 through optical cables 410, 411, 412 are divided into signals having various wavelengths by means of the second to fourth multiplexers/demultiplexers 414 to 416 and are transmitted into second to fourth groups of optical network units through N/4 third-branch optical cables 419-424.

Thus, the first remote node 450 has a first multiplexer/demultiplexer 402 coupled to two or more band splitting filters 405-408 configured to split a first composite optical signal that includes all of the wavelength channels in a first wavelength band (i.e. downstream signal A) into a first subset of wavelength channels (A+) and a second subset of wavelength channels (A−). The first band splitting filter 404 separates and couples a downstream and an upstream optical signal onto the same optical cable connected to the central office 400. The first 1×N multiplexer/demultiplexer 402 outputs N wavelength channels, where N is a subset of the total number of subscribers coupled in the optical data path of the first 1×N multiplexer/demultiplexer 402.

The second remote node 452 contains a first multiplexer/demultiplexer 413 that receives the first subset of wavelength channels from the first remote node 450, a second multiplexer/demultiplexer 414 to receive the second subset of wavelength channels from the first remote node 450, a third multiplexer/demultiplexer 415 to receive the third wavelength portion (A+) of the first A wavelength band from the first remote node 450, and a fourth multiplexer/demultiplexer 416 to receive the fourth wavelength portion (A+) of the first A wavelength band from the first remote node 450.

The upstream signal transmitted from each optical network unit 440, i.e., the optical having the B wavelength band, is transmitted from the optical network unit 440 to the central office 400 through a predetermined transmission procedure in an order reverse to that of the transmission procedure of the downstream signal. Herein, four upstream subsets of wavelength channels that have the B wavelength band and that are inputted into the second to fifth optical filters 405 to 408 through second-branch optical cables 409-412 are transmitted to the central office 400 through the first optical filter 404 after being multiplexed by means of the multiplexer 403 of the first remote node 450.

The demultiplexer 402 and the multiplexer 403 of the first remote node and the first to fourth multiplexers/demultiplexers 413 to 416 of the second remote node 452 may be embodied in the form of AWGs or 8-skip-2 optical fibers. Thus, the second remote node 452 sends the first through the fourth subsets of the wavelength channels in a second B wavelength band to a second multiplexer/demultiplexer 403 in the first remote distribution node 450 via the band splitting filters 405-408. The second multiplexer/demultiplexer 403 combines the wavelength channels from the first through the fourth subsets of the wavelength channels.

Figure 5:
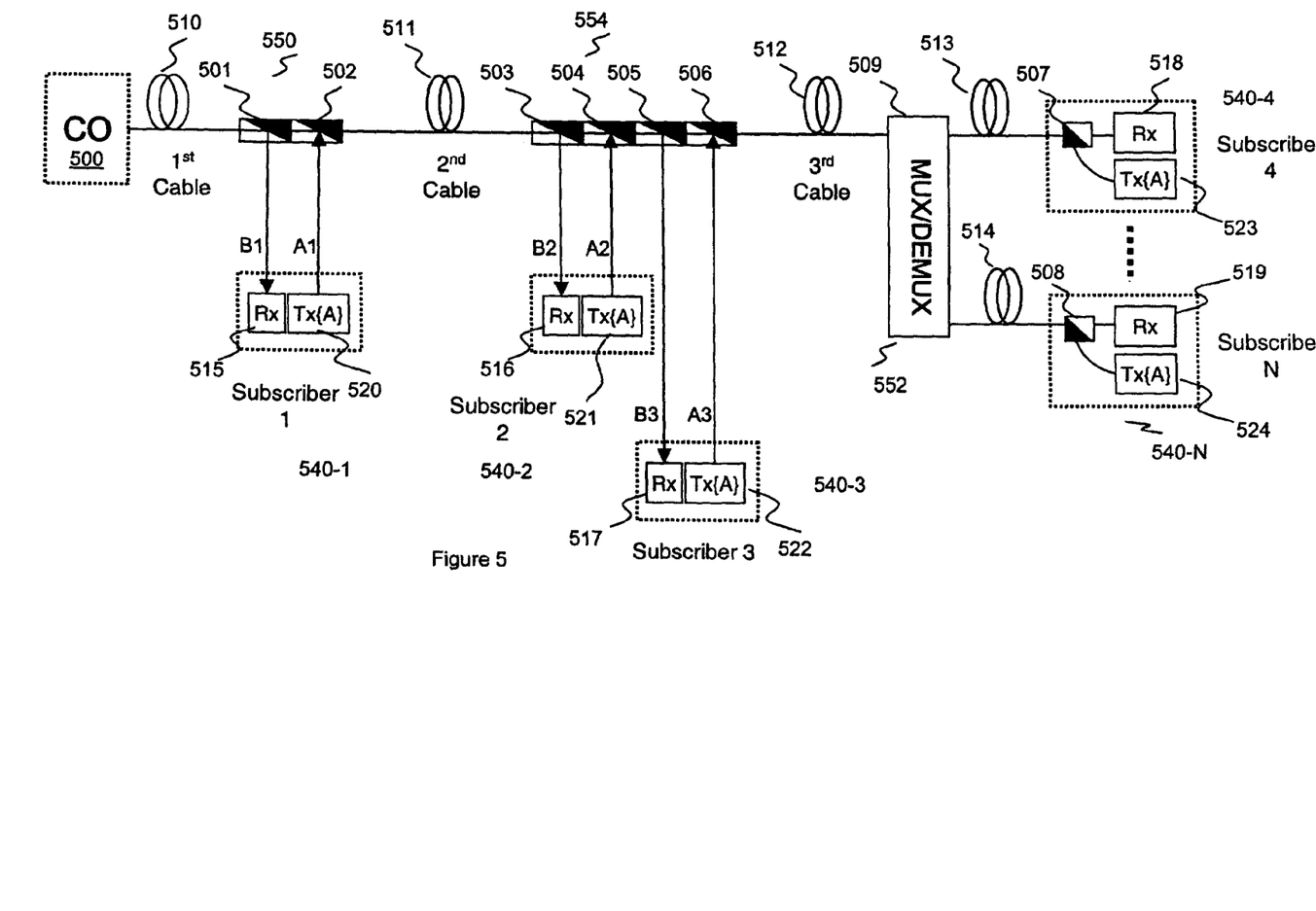
FIG. 5 is a block diagram of a structure of a WDM-PON having multiple branches of optical distribution employing an add/drop scheme.

FIG. 5 is a block diagram of the structure of a WDM-PON having multiple branches of optical distribution employing an add/drop scheme.

First, the present embodiment will be described in relation to a downstream signal transmitted to each optical network unit 540 from a central office 500.

The composite optical signal having all of the various wavelength channels from the central office 500 are transferred to a first remote node 550 through a first-branch optical cable 510. Herein, a downstream signal having a wavelength channel allocated to a first optical network unit 540-1 is dropped at a drop filter 501 of the first remote node 550 into an optical receiver 515 of the first optical network unit 540-1.

Subsequently, the optical signal having the remaining wavelength channels are transferred to a second remote node 554 through a second-branch optical cable 503. Herein, a downstream signal having a second wavelength channel allocated to a second optical network unit 540-2 is dropped at a first drop filter 503 of the second remote node 554 into an optical receiver 516 of the second optical network unit 540-2. In addition, a downstream signal having a third wavelength channel allocated to a third optical network unit 540-3 is dropped at a second drop filter 505 of the second remote node 554 into an optical receiver 517 of the third optical network unit 540-3.

Further, the optical signal having the remaining wavelength channels are transmitted to a multiplexer/demultiplexer 509 through a third-branch optical cable 512. Herein, the optical signals are divided into signals having wavelength channels allocated to optical network units and transmitted to each of the optical network units 540-4 and 540-N.

Thus, the third remote node 552 includes a first multiplexer/demultiplexer 509 and a first remote node 550 includes at least one add drop module 501, 502. A first drop module 501 removes a wavelength channel from a composite optical signal that includes all of the wavelength channels. The first multiplexer/demultiplexer 509 distributes two or more of the wavelength channels in the composite optical signal to the optical network units 540-4-540-N.

In addition, when the upstream signal is transmitted to the central office 500 from the optical network unit 540, an optical signal outputted from an optical transmitter 520 of the first optical network unit 540-1 is added at an add filter 502 of the first remote node 550, and then transmitted to the central office 500 through the first-branch optical cable 510.

Similarly, optical signals outputted from second and third optical network units 540-2 and 540-3 are added at first and second add filters 504 and 506 of the second remote node 554, and then transmitted to the central office 500. In addition, the remaining optical signals outputted from fourth and $N^{th}$ optical network units 540-4 and 540-N are transmitted to the central office 500 through the multiplexer/demultiplexer 509 in the same manner as described above.

Preferably, the add/drop filters of the remote nodes are connected to optical transmitters/receivers of the optical network units through separate optical cables.

Thus, two or more add/drop modules 501-506 couple to an optical fiber from the central office 500 to the third remote node 552 containing a first multiplexer/demultiplexer 509. The add/drop modules 501, 503, 505 remove wavelength channels from the downstream optical signal prior to the first multiplexer/demultiplexer 509. The add/drop modules 502, 504, 506 add wavelength channels to the upstream signal after the first multiplexer/demultiplexer 509.

Although the present embodiment has been described in relation to three optical network units outputting optical signals being added or dropped at add filters or drop filters, the present invention does not limit the number of optical network units outputting optical signals being added or dropped. In other words, the add/drop operation can be carried out in relation to all optical network units.

As described above, since the optical distribution network of the WDM-PON includes a plurality of remote nodes and multiple branch optical cables, the optical distribution network can be effectively located in a region in which optical network units are sporadically distributed over the whole area of the region. Thus, the distance between the remote node and the optical network unit is shortened so that it is possible to save an amount of optical fibers to be used. In addition, since the distance between the remote node and the optical network unit becomes shortened, installation work for the optical distribution network can be easily carried out.

With respect to large cities in which the optical network units are concentrated, the optical distribution network is generally installed by using cables buried in the ground. However, as the number of optical distribution networks increases, it is difficult to cover the optical distribution networks with existing cables buried in the ground. The optical distribution network having the multiple branch structure according to the present invention can reduce the amount of optical fibers to be buried in the ground, so it is possible to effectively manage existing cables buried in the ground.

In addition, because the WDM-PON includes a plurality of remote nodes, the WDM-PON can be effectively installed at a desired location with various alignments by taking geographic features into consideration.

In the forgoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustration rather than a restrictive sense.

What is claimed is:

1. A wavelength division multiplexing passive optical network (WDM-PON) for performing bi-directional communication, the WDM-PON comprising:

at least three remote distribution nodes between a central office and a first optical network unit, including a first remote distribution node, a second remote distribution node, and a third remote distribution node, each of the first remote distribution node and the second remote distribution node is located in a physically separate location, wherein the first remote distribution node, the second remote distribution node, and the third remote distribution node are connected to each other sequentially, wherein the first remote distribution node includes at least one filter configured to couple a first composite optical signal and a second composite optical signal to a first optical cable connected to the central office, wherein the first composite signal travels on the first optical cable in a first direction, and the second composite optical signal travels on the first optical cable in a second direction opposite the first direction, and configured to connect to the second remote distribution node comprising at least two filters coupled to at least two optical network units, wherein each of the first remote distribution node and the second remote distribution node are configured to separate at least one wavelength channel from the first composite optical signal distributed through that remote distribution node, wherein the third remote distribution node comprises a multiplexer/demultiplexer.

2. A wavelength division multiplexing passive optical network (WDM-PON) for performing bi-directional communication, the WDM-PON comprising:

at least two remote distribution nodes including a first remote distribution node and a second remote distribution node between a central office and a plurality of optical network units, each of the first remote distribution node and the second remote distribution node is located in a physically separate location, wherein the first remote distribution node and the second remote distribution node are connected to each other sequentially, wherein the first remote distribution node has a plurality of band splitting filters, and a first multiplexer/demultiplexer and a second multiplexer/demultiplexer coupled to the plurality of band splitting filters, wherein the first remote distribution node is configured to couple a first composite optical signal and a second composite optical signal to a first optical cable connected to the central office, wherein the first composite signal travels on the first optical cable in a first direction, and the second composite optical signal travels on the first optical cable in a second direction opposite the first direction, and wherein the first remote distribution node is configured to connect to the second remote distribution node coupled to at least two optical network units, wherein each of the first remote distribution node and the second remote distribution node are configured to separate at least one wavelength channel from the first composite optical signal distributed through that remote distribution node, wherein the first remote distribution node has the first multiplexer/demultiplexer coupled to at least two band splitting filters configured to split the first composite optical signal that includes all of the wavelength channels in a first wavelength band into a first subset of wavelength channels and a second subset of wavelength channels.

3. The WDM-PON of claim 2, wherein the
second remote distribution node includes a first multiplexer/demultiplexer to receive the first subset of wavelength channels from the first remote distribution node, a second multiplexer/demultiplexer to receive the second subset of wavelength channels from the first remote distribution node.

4. The WDM-PON of claim 3, wherein the second remote distribution node is configured to send a first through fourth portions of the wavelength channels in a second wavelength band to the second multiplexer/demultiplexer in the first remote distribution node via the band splitting filters, wherein the second multiplexer/demultiplexer is configured to combine the wavelength channels from the first through the fourth portions.

5. The WDM-PON of claim 2, wherein the at least one band splitting filter is further configured to separate the first composite optical signal and the second composite optical signal.

6. The WDM-PON of claim 1, wherein the at least one filter is an add drop module comprising a first drop module that is configured to remove a wavelength channel from the first composite optical signal that includes all of the wavelength channels and the multiplexer/demultiplexer is configured distribute at least two of the wavelength channels in the first composite optical signal.

7. The WDM-PON of claim 1, wherein the at least two filters comprises
at least two add/drop modules coupled to the third remote distribution node comprising the multiplexer/demultiplexer, wherein the add/drop modules to remove wavelength channels from the first composite optical signal prior to the multiplexer/demultiplexer.

8. A method, comprising:
separating a first composite optical signal that includes all of the wavelength channels in a first wavelength band in a transmission path between a central office and a plurality of optical network units into at least three smaller groups consisting of subsets of the wavelength channels; and
generating the at least three smaller groups consisting of subsets of the wavelength channels by sequentially separating the first composite optical signal along the transmission path at least three times by a first remote distribution node connected sequentially to a second remote distribution node which is connected sequentially to a third remote distribution node via at least one filter that is configured to couple the first composite optical signal and a second composite optical signal to a first optical cable connected to the central office, wherein the first composite signal travels on the first optical cable in a first direction, and the second composite optical signal travels on the first optical cable in a second direction opposite the first direction, wherein the second remote distribution node comprises at least two filters coupled to at least two optical network units, and the third remote distribution node comprises a multiplexer/demultiplexer.

9. The method of claim 8, further comprising:
combining at least two optical signals in a second wavelength band along the transmission path, each optical signal with at least one wavelength channel, wherein the second composite optical signal occupies a different wavelength band than the first composite optical signal.

10. An apparatus, comprising:
a first optical network unit including an optical receiver and an optical transmitter; and
means for separating a first composite optical signal that includes all of the wavelength channels in a first wavelength band into at least three smaller groups consisting of subsets of the wavelength channels in a transmission path between a central office and a plurality of optical network units, wherein the first composite optical signal is sequentially separated along the transmission path at least three times, wherein the means for separating includes a first remote distribution node connected sequentially to a second remote distribution node which is connected sequentially to a third distribution node via at least one filter to generate the at least three smaller groups consisting of subsets of the wavelength channels, wherein the at least one filter is configured to couple the first composite optical signal and a second composite optical signal to a first optical cable connected to the central office, wherein the first composite signal is transmitted on the first optical cable in a first direction, and the second composite optical signal is transmitted on the first optical cable in a second direction opposite the first direction, wherein the second remote distribution node comprises at least two filters coupled to at least two optical network units, and the third remote distribution node comprises a multiplexer/demultiplexer.

11. The apparatus of claim 10, further comprising:
means for combining at least two optical signals in a second wavelength band along the transmission path, each optical signal with at least one wavelength channels, wherein the second composite optical signal has a different wavelength band than the first composite optical signal.

* * * * *